United States Patent [19]
George

[11] Patent Number: 5,430,358
[45] Date of Patent: Jul. 4, 1995

[54] HIGH VOLTAGE VERTICAL DYNAMIC FOCUS AMPLIFIER

[75] Inventor: John B. George, Carmel, Ind.

[73] Assignee: Thomson Consumer Electronics, Inc., Indianapolis, Ind.

[21] Appl. No.: 241,024

[22] Filed: May 11, 1994

[51] Int. Cl.⁶ .............................................. H01J 29/58
[52] U.S. Cl. ................................................... 315/382
[58] Field of Search ............................. 315/382, 382.1

[56] References Cited

U.S. PATENT DOCUMENTS 4,549,216 10/1985 Yuki ...................... 315/411

Primary Examiner—Theodore M. Blum
Attorney, Agent, or Firm—Joseph S. Tripoli; Joseph J. Laks; Harvey D. Fried

[57] ABSTRACT

A current transformer has a primary side winding coupled to a source of horizontal rate sawtooth yoke current and a secondary side in which a horizontal rate AC signal is developed. A rectifier has at least one capacitor, the rectifier receiving the horizontal rate AC signal and energizing a DC voltage across the at least one capacitor. A modulator for the DC voltage generates a first deflection rate waveform. A capacitor coupled to the modulator and to the secondary side of the transformer generates a second deflection rate waveform. The first and second deflection rate waveforms are combined to define a vertical dynamic focus voltage signal.

20 Claims, 3 Drawing Sheets

HIGH VOLTAGE VERTICAL DYNAMIC FOCUS AMPLIFIER

This invention relates to the field of vertical dynamic focus amplifiers.

In a projection television having curved face plate cathode ray tubes, a vertical dynamic focus drive signal is required that is larger in magnitude than in previous projection televisions designs having cathode ray tubes that have flat face plates. Flat face plate cathode ray tubes normally require a vertical dynamic focus drive signal of less than 200 volts peak to peak. With curved face plates, a signal of 300 volts peak to peak or more may be required. The supply voltage typically used previously for the vertical dynamic focus amplifier, about +210 volts, is not sufficient to operate a class A series feedback amplifier at the voltage levels now required. Making a higher voltage supply is not convenient because a chassis cannot be easily changed. A conventional voltage doubler used with a series feedback amplifier can be unsatisfactory because supply loading causes output distortion. It is difficult to achieve a large peak to peak output swing with a series feedback amplifier because the bias is temperature sensitive. Sufficient margin against temperature variation must be maintained by lowering the peak to peak output so that clipping does not occur with temperature changes. Additionally, new direct view picture tubes, such as the Thomson FDT (flat dark tube) may also require a larger vertical dynamic focus drive than has been necessary for direct view cathode ray tubes. It is necessary to have a dynamic focus circuit that can easily meet the requirements of a variety of tubes both for projection televisions and direct view receivers.

A circuit which achieves a sufficient peak to peak swing, and which is substantially temperature insensitive, comprises: a current transformer having primary side winding coupled to a source of horizontal sawtooth shaped yoke current and having a secondary side in which a horizontal rate AC signal is developed responsive to the horizontal current; rectifying means having at least one capacitor, the rectifying means receiving the horizontal rate AC signal and energizing a DC voltage across the at least one capacitor; means for modulating the DC voltage and generating a first deflection rate waveform; means coupled to the modulating means and to the secondary side of the current transformer for generating a second deflection rate waveform; and, means for combining the first and second deflection rate waveforms to define a vertical dynamic focus voltage signal. The circuit further comprises: a cathode ray tube having a focus electrode coupled for receiving the vertical dynamic focus voltage signal; and, means for modulating the vertical dynamic focus voltage signal. A resistor and a capacitor are coupled in series between the first tap of the secondary winding and the focus electrode of the cathode ray tube. The first and second deflection rate waveforms are vertical and horizontal rate parabolic waveforms respectively.

In a first embodiment, the transformer has a secondary side winding, and both the rectifying means and the means for generating the second deflection rate waveform are coupled to the secondary side winding. The DC voltage across the at least one capacitor floats with respect to ground. The modulating means comprises a variable current source responsive to a first vertical rate waveform, the first deflection rate waveform having a variable DC level controlled by the variable current. More particularly, the modulating means comprises: a transistor collector coupled to the DC voltage, emitter coupled to a source of constant voltage potential, for example ground, through a first resistor and base coupled to the first vertical rate waveform; and, a capacitor and a second resistor coupled in parallel with one another, between the DC voltage level and the source of constant voltage potential.

In a second embodiment, the transformer has two secondary side windings, the rectifying means being coupled to one of the secondary side windings and the means for generating the second deflection rate waveform being coupled to the other of the secondary side windings. The rectifying means comprises: switching means and a diode, each coupled between a second DC voltage and the at least one capacitor, the switching means being responsive to the horizontal rate AC signal to charge the at least one capacitor to the DC voltage; and, means for combining the DC voltage on the at least one capacitor and the second DC voltage, the combined DC voltages being supplied to said modulating means. The modulating means comprises: a Darlington differential amplifier responsive to the first vertical rate waveform, having a peak detector for detecting a peak voltage of the first vertical rate waveform and a capacitor for holding the detected peak voltage.

Figure 1:
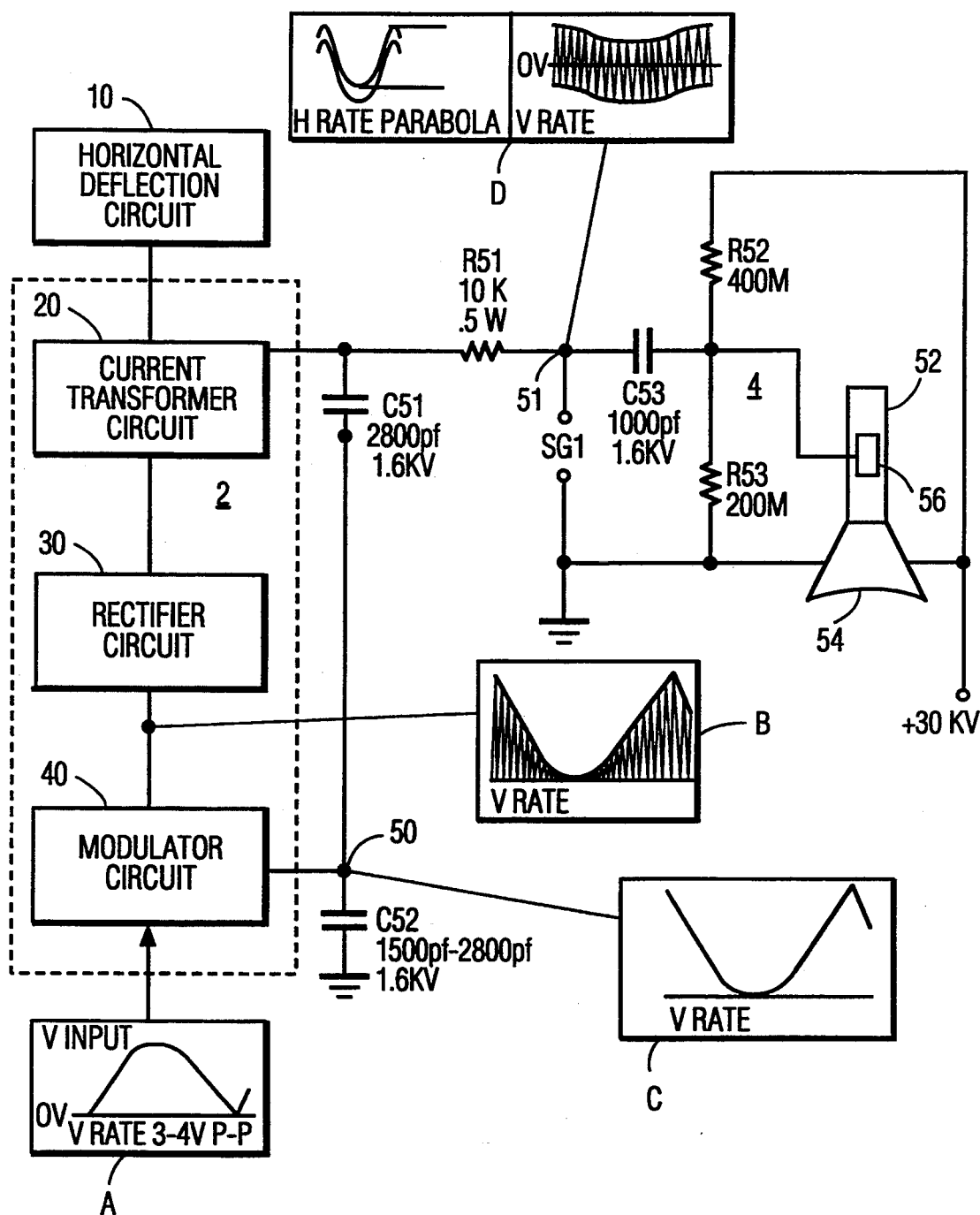
FIG. 1 is a block diagram of a high voltage vertical dynamic focus amplifier in accordance with the invention, supplying a vertical dynamic focus drive signal to a focus electrode of a cathode ray tube.
Figure 2:
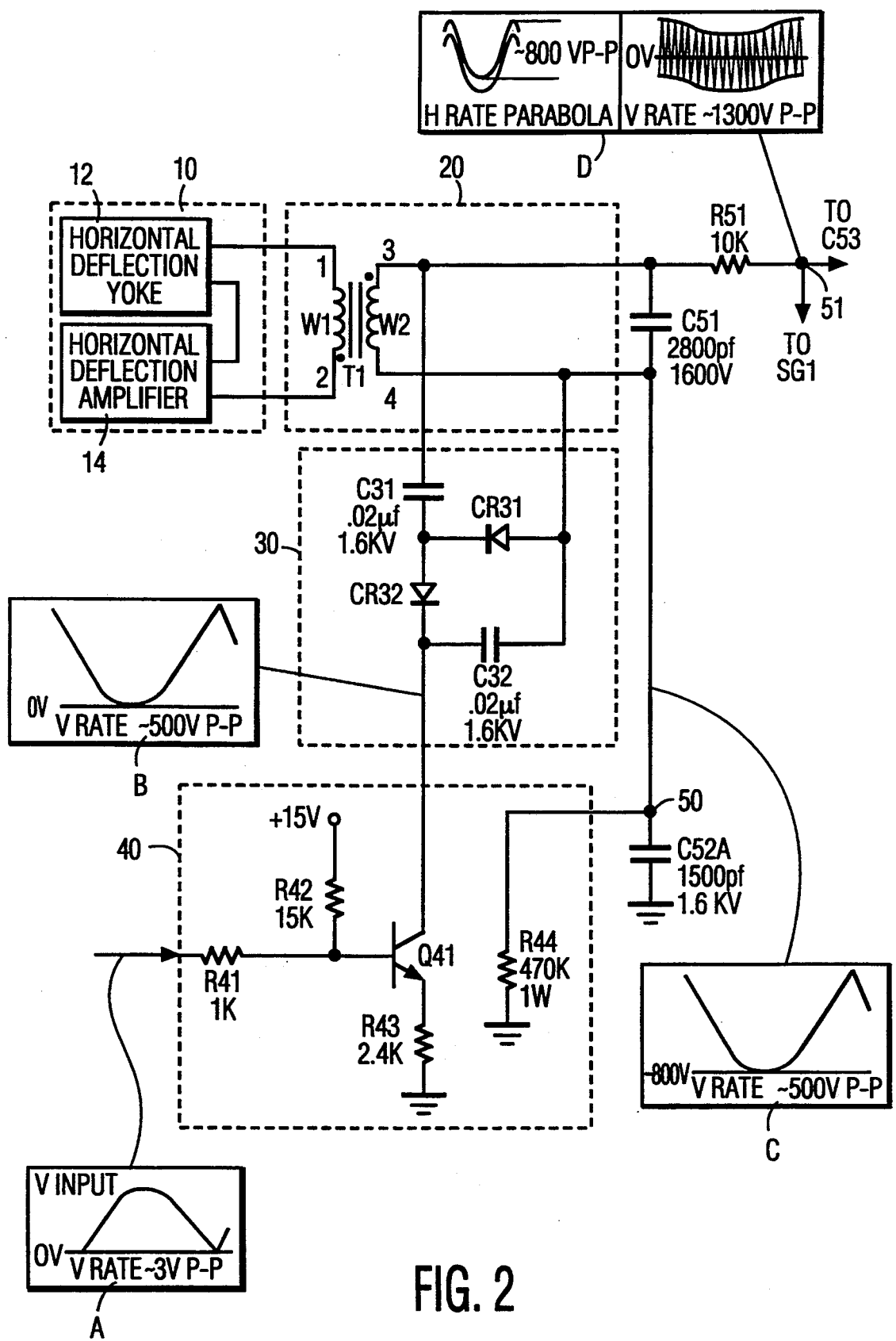
FIG. 2 is a circuit schematic of a first embodiment of the amplifier shown in FIG. 1.
Figure 3:
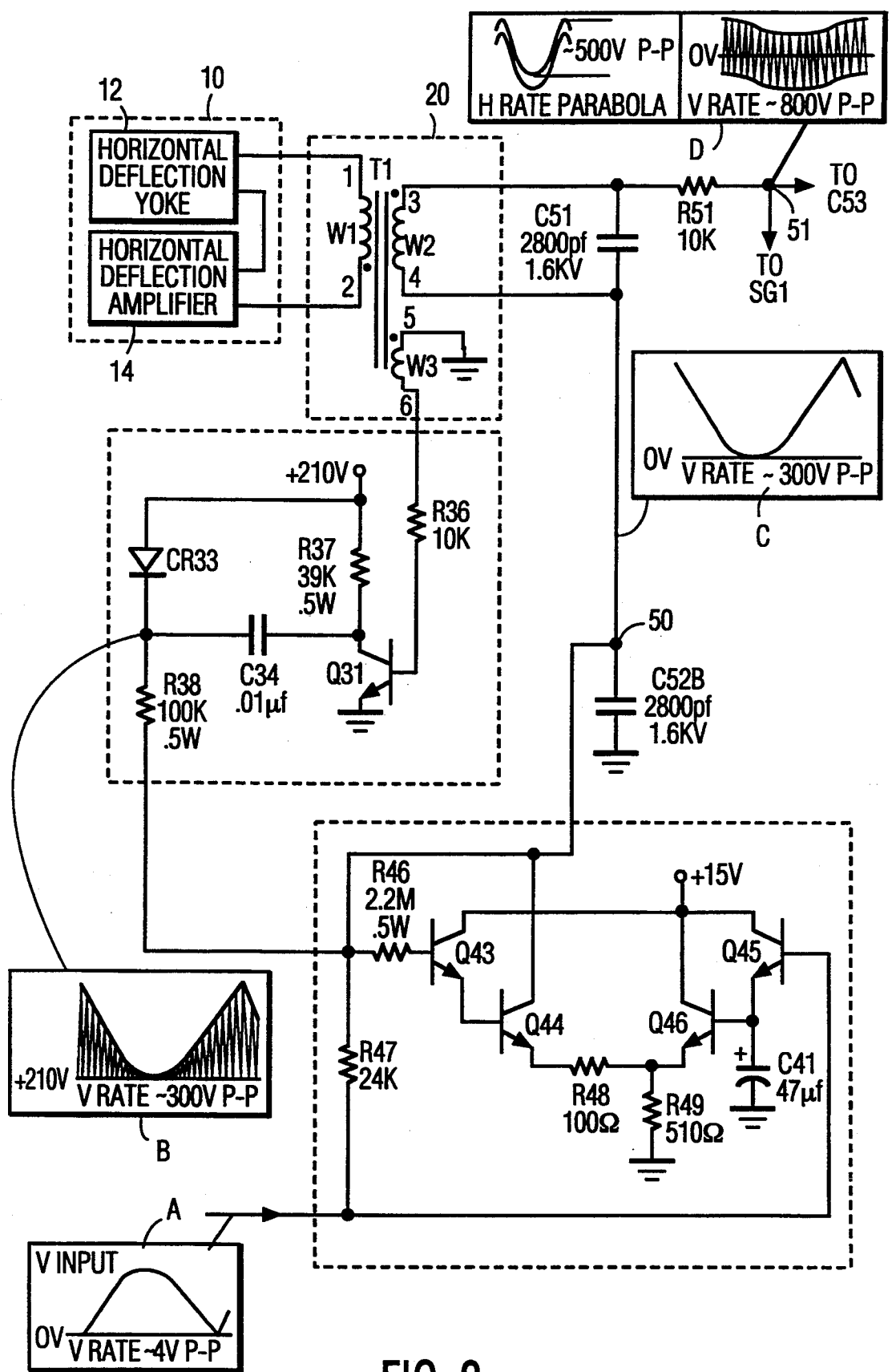
FIG. 3 is a circuit schematic of a second embodiment of the amplifier shown in FIG. 1.

FIG. 1 illustrates a high voltage vertical dynamic focus amplifier 2 in accordance with the invention, together with a cathode ray tube 52 and associated connecting circuitry 4. The amplifier 2, as shown in block diagram form, is generic to a plurality of embodiments, two of which are shown in FIGS. 2 and 3 respectively. In all cases, the amplifier has an extended range and is automatically biased, particularly with respect to temperature drift. In general, vertical dynamic focus drive signals are generated by adding a horizontal rate parabolic waveform and a vertical rate parabolic waveform.

Cathode ray tubes typically have an aspect ratio of 4/3, or more recently, 16/9. Horizontal is usually larger than vertical. The required dynamic focus correction increases as the distance from the tube center, so horizontal correction voltage typically exceeds vertical correction voltage. The horizontal rate parabolic waveform is typically generated by coupling a capacitor to a source of horizontal sawtooth yoke current through a current transformer, and for example, may have a peak to peak voltage of about 500 volts. The peak to peak voltage of this horizontal rate parabolic waveform is increased by generating the vertical rate parabolic waveform with as high a peak to peak voltage as possible. The peak to peak voltage of the vertical rate parabolic waveform has, in the past, been limited by the supply voltage, for example a flyback derived secondary side supply, normally generated in a television receiver for the cathode ray tube cathode driver amplifier, for example about 210 volts. It is inconvenient for a number of reasons to simply increase this voltage to generate a higher vertical dynamic focus voltage. Operating the cathode driver amplifiers at a much higher supply voltage would require much more expensive transistor devices because it is much more difficult to achieve the necessary fast rise times at higher supply voltages. Further, devices which might be capable of such operation would have much higher levels of power dissipation. Moreover, it would be necessary to so modify three such circuits to operate at the higher supply voltage. In the context of this invention, extended range connotes an amplifier which can generate the vertical rate parabola with a peak to peak voltage which is greater than the supply voltage, for example about 300 volts to about 500 volts.

The vertical amplifier 2 utilizes signals generated by a horizontal deflection circuit 10, and includes a current transformer circuit 20, a rectifier circuit 30 and a modulator circuit 40. The inclusion or non inclusion of various elements as part of the amplifier or part of the environment is somewhat arbitrary, and made for purposes of convenience. The horizontal deflection circuit 20 supplies horizontal sawtooth yoke current from a flyback transformer, not shown, to a primary side of a transformer in the current transformer circuit 20. Capacitor C51 is coupled to a secondary side winding of the transformer and is responsive to the horizontal current flowing in the primary side of the transformer. The rectifier circuit 30 is also coupled to a secondary side winding of the transformer and is responsive to the horizontal sawtooth current flowing in the primary side of the transformer. In one embodiment, the secondary parabolic voltage is rectified to directly develop a source of energy for generating a DC voltage level greater than the supply voltage. In another embodiment, a small parabolic voltage is used indirectly as a switching control signal for a switching circuit which is energized by the supply voltage to generate a DC voltage level greater than the supply voltage. In each embodiment, a DC voltage source is established in an energy storage device, for example a capacitor. The energy storage device is replenished at a horizontal rate, and accordingly, is a very steady voltage source. In terms of calculating operating parameters of the circuits in which the invention is embodied, the energy storage device may even be considered to function as a high voltage battery. The DC voltage is modulated at a vertical rate, as shown by waveform B, by the modulator circuit 40.

The modulator circuit 40 modulates the DC voltage level responsive to a first vertical rate parabolic waveform A having a zero value amplitude during vertical retrace and otherwise a small amplitude, for example 3 to 4 volts peak to peak, to generate a second vertical rate parabolic waveform C having a large amplitude, for example about 300 to 500 volts peak to peak, at junction 50. Junction 50 is the junction of capacitors C51 and C52. In one embodiment, the modulator circuit comprises a Darlington differential amplifier. In another embodiment, the modulator circuit comprises a variable current source.

The horizontal correction is achieved by reflecting a capacitive load on a large secondary winding through the current transformer. The transformer primary winding has few turns and is coupled in series with the horizontal deflection yoke. The sawtooth current flowing in the load capacitor C51 produces a large horizontal rate parabolic voltage, typically about 500 volts to 800 volts peak to peak. The second vertical rate parabolic waveform and the horizontal rate parabolic waveform are combined at the common connection of capacitor C51 and resistor R51, and appear as shown by the left part of waveform D at junction 51. The sum of the horizontal and vertical rate parabolas is AC coupled to the focus electrode 56 of cathode ray tube 52 through capacitor C53. At the vertical rate of waveform D, shown on the right, the peak to peak voltage can be in the range of about 800 volts to 1,300 volts. A DC bias level of 10 KV is established by a voltage divider formed by resistors R52 and R53, which are coupled in series between the 30 KV high voltage level and ground. The focus electrode is then modulated at terminal SG1 so as to provide the best focus at all points on the CRT face plate 54. The time constant of capacitor C53 and the parallel combination of resistors R52 and R53 is chosen to pass frequencies above about 60 Hz.

The horizontal rate parabolic signal generated across capacitor C51 needs to appear with minimum attenuation between the focus electrode 56 and ground. There are three CRTs in a projection television, and there are three focus electrodes in parallel, only one of which is shown. Each focus electrode has a capacitance of about 15 pf and has external wiring capacitance of about 25 pf, making a total of 40 pf. Each focus electrode has a capacitor C53 (1000 pf) in series. In one embodiment, each CRT additionally has ⅓ of the capacitance of capacitor C51 (500 pf) in series. This means that each of the 3 circuits has about 333 pf in series with 40 pf, and each delivers about 89% of the horizontal signal to the focus electrode. In another embodiment, each CRT additionally has ⅓ of the capacitance of capacitor C51 (933 pf) in series. This means that each of the three circuits has about 483 pf in series with 40 pf, and each also delivers about 91% of the horizontal signal to the focus electrode.

Two more specific embodiments of the circuit are shown in FIGS. 2 and 3, wherein waveforms A, B, C and D have the same shapes as in FIG. 1, but have different peak to peak amplitudes and/or DC values. The waveforms are uniformly referred to as waveforms A, B, C and D to demonstrate the similarities in general operation, notwithstanding the differences between the embodiments.

A first embodiment is shown schematically in FIG. 2. The input vertical rate parabola A has a peak to peak amplitude of about 3 volts and has zero volts amplitude during vertical retrace. This signal is applied to resistor R41. Resistors R41 and R42 form a DC bias system that raises the most negative part of the vertical rate parabola A to about 0.8 volts. Transistor Q41 acts as a current source and resistor R43 sets the current level. The amplifier DC gain is the resistance of resistor R44, coupled to junction 50 in parallel with capacitor C52A, divided by the resistance of resistor R43 (R44/R43), about 195. This gain is not fully realized in the bandwidth of the vertical signals (60 Hz to 250 Hz) because capacitor C52A forms a low pass filter and introduces loss. A gain of about 170 is observed. In this embodiment, the capacitor identified in FIG. 1 as C52 is identified as capacitor C52A and has a value of 1500 pf. The vertical rate signal varies the DC average of the horizontal rate signal such that the sum of the two signals appears at the focus electrode.

The horizontal correction is achieved by reflecting a capacitive load on a large secondary winding through a current transformer T1. The primary side of transformer T1 has a winding W1. Taps 1 and 2 couple the primary side winding W1 in series with the horizontal deflection yoke 12, energized by the horizontal deflection amplifier 14. The secondary side of transformer T1 has a winding W2. Taps 3 and 4 of secondary side winding W2 are coupled across capacitor C51. Other secondary side windings are omitted from the drawing. Primary side winding W1 has only a few turns compared with secondary side winding W2. The sawtooth current flowing in the load capacitor C51 produces a large horizontal rate parabolic voltage signal B, typically 800 volts peak to peak.

The input to circuit 30 from circuit 20 is coupled across winding W2. Circuit 30 rectifies and filters this large horizontal rate parabolic voltage signal using a peak to peak detector including diodes CR31 and CR32 and capacitors C31 and C32. A DC voltage of about 800 volts appears across capacitor C32. This voltage is greater than the peak to peak voltage which must be achieved by the vertical rate parabolic waveform in order to meet the minimum peak to peak voltage requirement of the vertical dynamic focus voltage. Capacitor C32 may be thought of, and acts like a battery that floats with respect to ground and energizes the vertical amplifier 2.

As long as the voltage across capacitor C32 is sufficient to prevent clipping, it does not affect the amplifier performance, because resistor R44 is only responsive to the current source current from transistor Q41. Transistor Q41 and resistor R44 form, in effect, a voltage divider with ground as a tap. If transistor Q41 is non conductive, there is no current through resistor R44 and ground is near the minus (−) end of the capacitor C32 800 volt battery. When transistor Q41 is saturated, there is a large current through resistor R44 and ground is near the plus (+) end of the capacitor C32 800 volt battery. During operation of transistor Q41 in between these limits, the tap varies linearly with the current in transistor Q41. Since the secondary side pin 4 is connected to resistor R44, the DC average of the horizontal rate parabola can be changed by changing the voltage across resistor R44. Waveform B has a peak to peak voltage of about 500 volts, and the negative peak is at zero volts. At junction 50, waveform C has the same peak to peak voltage of about 500 volts, but the negative peak is at about −800 volts. The vertical rate signal D appears at the focus electrode because the DC bias at the focus terminal is applied through means of the very high resistance divider formed by resistors R52 and R53, described in connection with FIG. 1. The peak to peak voltage of the vertical rate waveform D represents the sum of the horizontal rate peak to peak voltage of about 800 volts and the vertical rate peak to peak voltage of waveform C of about 500 volts, namely about 1,300 volts peak to peak.

A second embodiment is shown schematically in FIG. 3. The input vertical rate parabola A has a peak to peak amplitude of about 4 volts, with zero volts amplitude during vertical retrace. This signal is applied to resistor R47 and the base of transistor Q45. Resistors R46 and R47 form a shunt feedback system that sets the ideal amplifier gain at about 90. This is not fully realized because the open loop gain is not extra large compared to 90. A gain of 75 to 80 is observed.

Transistors Q43 and Q44 form a first transistor pair. Transistors Q45 and Q46 form a second transistor pair. The transistor pairs (Q43/Q44, Q45/Q46) form a Darlington differential amplifier. In addition, transistor Q45 is used as a peak detector for the waveform A input signal. The peak voltage of the waveform A input signal is held on electrolytic capacitor C21. This forces the differential amplifier transistor pair Q44/Q46 to balance at the peak of the input waveform A and this balance tracks the peak due to the sample and hold action of transistor Q45 and capacitor C41.

The current through feedback resistor R46 must be near zero response at the output, that is, across capacitor C52B. In this embodiment, the capacitor identified in FIG. 1 as C52 is identified as capacitor C52B and has a value of 2800 pf. The output will then be negative peak clamped to zero, as shown by waveform C, and will have a peak to peak voltage determined by the input waveform and the resistance of resistor R46 divided by the resistance of R47 (R46/R47). These conditions will be temperature stable due to the temperature tracking of the differential pair of base to emitter voltages. The output will be independent of the +210 volt supply voltage as long as the output is not trying to exceed the +210 supply voltage. Then clipping will occur.

The amplifier range is extended by adding a pulse to the +210 volt level of the supply by means of a circuit which can be described as a horizontal rate charge pump, in rectifier circuit 30. The connections of horizontal deflection circuit 10 and the current transformer circuit 20 are the same as described in connection with FIG. 2. A second secondary side winding W3 of transformer T1 is shown. Taps 5 and 6 of secondary side winding W3 are coupled to ground and resistor R36. Resistor R36 is coupled to the base of transistor Q31.

Accordingly, the horizontal rate drive signal for transistor Q31 is a horizontal rate AC signal from the dynamic focus current transformer T1 winding W3. Transistor Q31 chops the +210 volts supply, coupled to the collector of transistor Q31 through resistor R37, into a horizontal rate square wave signal. The horizontal rate square wave signal is capacitor coupled through capacitor C34 to diode CR33, which clamps the negative peak to 210 volts, as shown by waveform B. The positive peak is determined by the current required by resistor R37. The higher the output voltage, the lower the current through resistor R37 and the higher the positive peak and the DC average at the cathode of diode CR33. Capacitor C52B filters out most of the horizontal rate variations and leaves the desired vertical rate output signal with an extended amplitude of about 300 volts peak to peak, as shown by waveform C. This vertical rate parabola signal is added to the horizontal rate parabola signal that is generated across capacitor C51 by the winding W2 of current transformer T1, as described previously. In this embodiment, the horizontal rate parabola has a peak to peak voltage of about 500 volts, as shown in waveform D. The sum of the horizontal and vertical rate parabolas, which in this embodiment has a peak to peak voltage of about 800 volts, is AC coupled to the focus electrode through capacitor C53.

In all embodiments, the peak to peak voltage of the vertical dynamic focus signal is substantially extended, and at the same time, stabilized against temperature drift.

What is claimed is:
1. A circuit, comprising:
   a current transformer having primary side winding coupled to a source of horizontal sawtooth yoke current and having a secondary side in which a horizontal rate AC signal is developed responsive to said horizontal current;

rectifying means having at least one capacitor, said rectifying means receiving said horizontal rate AC signal and energizing a DC voltage across said at least one capacitor;

means for modulating said DC voltage and generating a first deflection rate waveform;

means coupled to said modulating means and to said secondary side of said current transformer for generating a second deflection rate waveform; and, means for combining said first and second deflection rate waveforms to define a vertical dynamic focus voltage signal.

2. The circuit of claim 1, further comprising:

a cathode ray tube having a focus electrode coupled for receiving said vertical dynamic focus voltage signal; and, means for modulating said vertical dynamic focus voltage signal.

3. The circuit of claim 1, wherein said first and second deflection rate waveforms are vertical and horizontal rate parabolic waveforms, respectively.

4. The circuit of claim 1, wherein said means for generating said second deflection rate waveform comprises a second capacitor coupled across a secondary side winding of said transformer.

5. The circuit of claim 1, further comprising a resistor and a second capacitor for AC coupling said vertical dynamic focus voltage signal to a focus electrode of a cathode ray tube.

6. The circuit of claim 1, wherein said transformer has a secondary side winding, and both said rectifying means and said means for generating said second deflection rate waveform are coupled to said secondary side winding.

7. The circuit of claim 1, wherein said modulating means comprises a variable current source responsive to a first vertical rate waveform, said first deflection rate waveform having a variable DC level controlled by said variable current.

8. The circuit of claim 1, wherein said transformer has two secondary side windings, said rectifying means being coupled to one of said secondary side windings and said means for generating said second deflection rate waveform being coupled to the other of said secondary side windings.

9. The circuit of claim 1, wherein said rectifying means comprises:

switching means and a diode, each coupled between a second DC voltage and said at least one capacitor, said switching means being responsive to said horizontal rate AC signal to charge said at least one capacitor to said DC voltage; and, means for combining said DC voltage on said at least one capacitor and said second DC voltage, sad combined DC voltages being supplied to said modulating means.

10. A circuit, comprising:

a transformer having primary and secondary windings, a deflection rate AC signal being generated in said secondary winding responsive to a horizontal rate sawtooth current in said primary winding;

first means coupled across said secondary winding of said transformer for generating a first deflection rate waveform responsive to said AC signal:

second means coupled across said secondary winding for rectifying said AC signal to generate a DC voltage signal component;

means for modulating said DC voltage signal component to generate a second deflection rate waveform: and, means for combining said first and second deflection rate waveforms to define a vertical dynamic focus voltage signal.

11. The circuit of claim 10, wherein said rectifying means comprises a bridge rectifier network, said network having a capacitor energized as a source for said DC voltage signal component.

12. The circuit of claim 11, wherein said DC voltage signal component source floats.

13. The circuit of claim 12, wherein said modulating means comprises a variable current source responsive to a first vertical rate waveform, said second deflection rate waveform having a variable DC level controlled by said variable current.

14. The circuit of clam 11, wherein said modulating means comprises:

a transistor collector coupled to said DC voltage component source, emitter coupled to ground through a first resistor and base coupled to a modulating input waveform; and, a capacitor and a second resistor coupled in parallel with one another, between said DC voltage component source and ground.

15. A circuit, comprising:

a transformer having primary and secondary windings, a deflection rate AC signal being generated in said secondary winding responsive to a horizontal rate sawtooth current in said primary winding;

means coupled to said secondary winding for rectifying said AC signal and energizing a floating DC voltage source in said rectifying means;

means for modulating said DC voltage signal component to generate a floating deflection rate waveform having an average DC level determined by said modulating means; and, means for combining said floating deflection rate waveform and a second deflection rate waveform to define a vertical dynamic focus voltage signal.

16. The circuit of claim 15, further comprising a second capacitor coupled across said secondary winding of said transformer for generating said second deflection rate waveform.

17. The circuit of claim 15, wherein one side of said floating DC voltage source is coupled to said secondary winding and coupled to a source of constant potential through a first resistor and the other side of said floating voltage source is coupled to said source of constant potential through switching means and a second resistor, said switching means being responsive to a modulating input signal.

18. A circuit, comprising:

a transformer having a primary winding and two secondary windings, a deflection rate AC signal being generated in said secondary windings responsive to horizontal rate sawtooth current in said primary winding;

switching means coupled to a DC supply voltage and to one of said two secondary windings for energizing an auxiliary DC voltage;

means for combining said DC supply voltage and said auxiliary DC voltage to define a composite DC voltage signal component at a voltage greater than said DC supply voltage;

means for modulating said DC voltage signal component to generate a first deflection rate waveform having a peak to peak voltage greater than said DC supply voltage; and, means for combining said first deflection rate waveform and a second deflection rate waveform to define a vertical dynamic focus voltage signal having a peak to peak voltage related to peak to peak voltages of said first and second deflection rate waveforms.

19. The circuit of claim 18, further comprising a second capacitor coupled across the other of said two secondary windings of said transformer for generating said second deflection rate waveform.

20. The circuit of claim 18, wherein said first deflection rate waveform has a negative peak value clamped to zero volts.

* * * * *